April 8, 1924.

I. J. MERRILL

MECHANICAL MOVEMENT

Filed Aug. 9, 1922  3 Sheets-Sheet 2

1,489,776

INVENTOR
Ira J. Merrill
BY
H.L. & C.L. Reynolds
ATTORNEYS

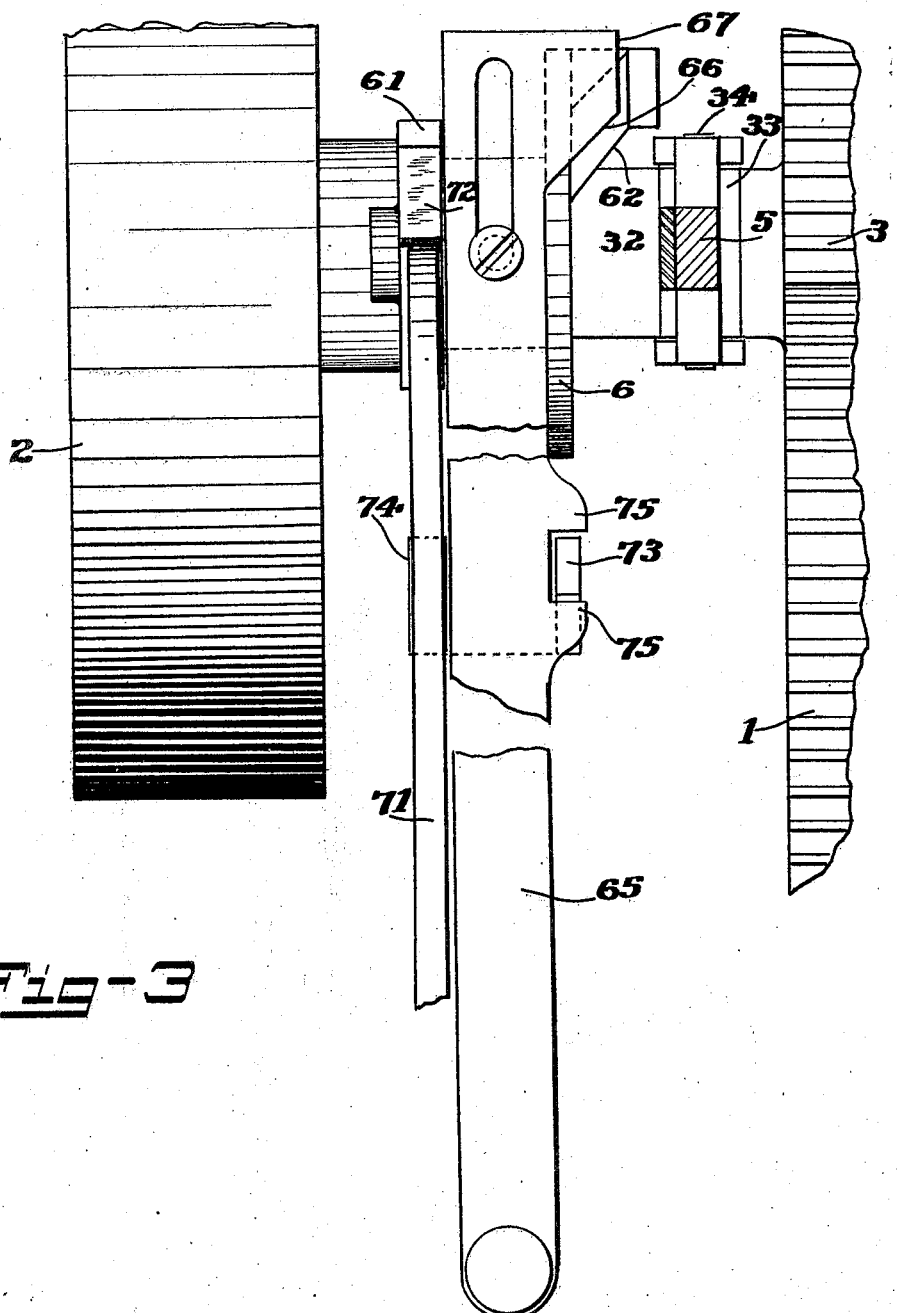

Patented Apr. 8, 1924.

1,489,776

UNITED STATES PATENT OFFICE.

IRA J. MERRILL, OF SEATTLE, WASHINGTON.

MECHANICAL MOVEMENT.

Application filed August 9, 1922. Serial No. 580,600.

*To all whom it may concern:*

Be it known that I, IRA J. MERRILL, a citizen of the United States of America, and resident of the city of Seattle, in the county of King and State of Washington, have invented certain new and useful Improvements in Mechanical Movements, of which the following is a specification.

My invention relates to an improvement in mechanical movements, and particularly in such mechanism as is intended for periodic reversal of a driven part.

My invention is particularly adapted for use upon clothes washing machines, in which a shaft carrying a cylinder is rotated for a period in a given direction, and then reversed and rotated in the opposite direction for a like period.

The principal object of my invention is to provide such reversing mechanism which shall be smooth in its action and in which the reversal is controlled directly from the reversible shaft.

My invention comprises those novel parts and combinations thereof which are shown in the accompanying drawings, described in the specification, and particularly defined by the claims terminating the same.

In the accompanying drawings I have shown my invention in the form which is now preferred by me.

Figure 3 is a plan view of the same.

Figure 1:
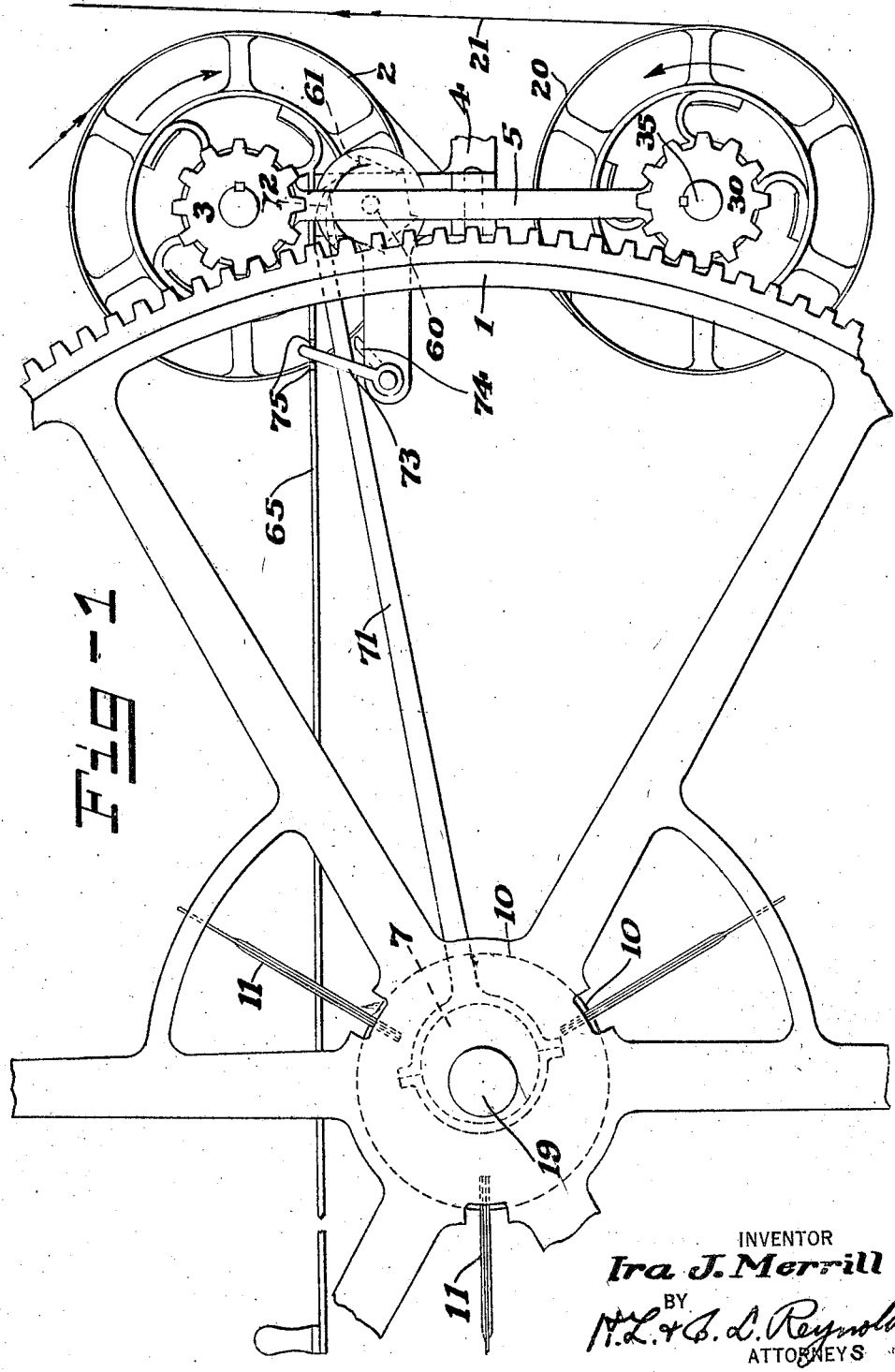
Figure 1 is an end elevation of an embodiment of my invention.

Rotary movement is communicated to two pulleys 2 and 20 by means of a belt 21 passing about the pulleys in the manner shown in Figure 1, so that the two rotate in opposite rotary directions. Each of the pulleys 2 and 20 carry elements 21 of a clutch. The complemental element 31 is secured upon a sleeve 32 upon which a pinion 3 or 30, as the case may be, is secured. Clutch-operating means, such as the collars 33 carrying pins 34, are actuatively connected to the sleeves 32. The sleeves 32 and the pinions and clutch elements secured thereto are slidable axially, as upon shafts 35 upon which the pulleys 2 or 20 are fastened. The pinions 3 or 30, however, remain continuously in mesh with the large gear 1, which they drive alternately.

Figure 2:
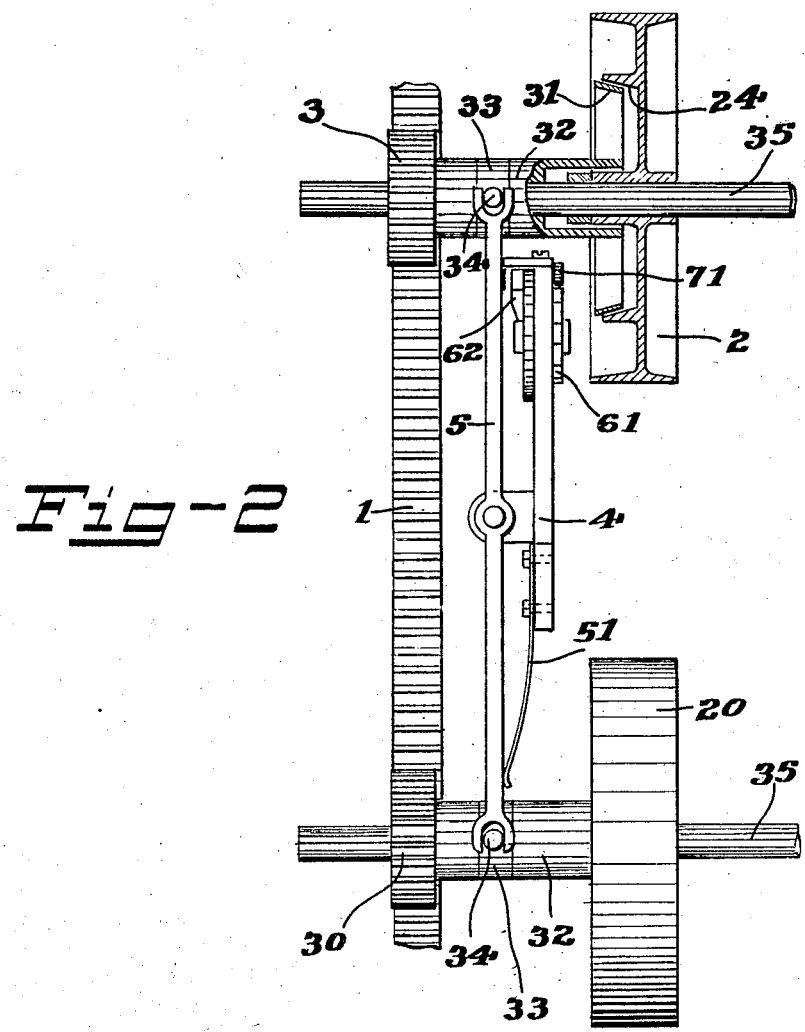
Figure 2 is in part a side elevation and in part a section of the same, parts being shown in neutral position.

Upon a frame member 4 a lever 5 is pivoted between its ends. At each end the lever 5 is forked to engage the pins 34. It will be obvious that as the lever 5 is rocked upon its pivot, one of the clutches 31, 24, will be thrown into engagement and the other will be thrown out of engagement. It is also possible to position the lever 5 as is shown in Figure 2, so that neither of the clutches are engaged. A spring 51 acts upon the lever 5 to throw the clutch connected with the gear 3 into engagement. Any other suitable clutch connecting means may be employed, as will be apparent.

The lever 5 is moved to actuate the clutches, in opposition to this spring 51, by cam means, which are illustrated in detail in Figure 3. A cam, which is shown as a wheel 6, is rotatable upon a shaft 60 by suitable means, a ratchet wheel 61 being shown as also secured upon the same shaft. This cam wheel carries a cam 62 which in its rotation engages the arm 5 to move it in opposition to the spring 51 to engage the clutch elements carried by the pulley 20 and pinion 30. The high point of such cam 62 would extend approximately one-half the distance about the cam wheel 6, and it would then be cut away to form the low point. As the high point of the cam passes from engagement with the lever 5 the action of the spring 51 throws out of engagement the clutch connected to the pulley 20 and throws into engagement the clutch connected to the pulley 2.

I also provide means whereby the clutch may be held in neutral position. This is shown as consisting of a handle 65 carrying at one end an inclined cam surface 66 terminating in a stop surface 67 which would be of somewhat less height than the high point of the cam 62. The cam 66 will engage the lever 5 if the latter is thrown over toward the low portion of the cam wheel 6, and the stop 67 will prevent further movement of the lever 5 in this direction.

For imparting movement to the shaft 60 I provide an eccentric 7 which is secured upon the driven shaft 19 which carries the gear 1. A yieldable connection between the gear 1 and the shaft driven thereby is desirable, particularly when jaw clutches are employed between the pinions and the pulleys. I have therefore shown a hub 10, secured upon shaft 19, upon which the gear 1 is loosely mounted, and to which it is connected for driving the shaft by means of springs 11.

An eccentric rod 71 carries at its end a pawl 72 which engages with the ratchet wheel 61 to rotate the latter, and thereby to rotate the cam wheel 6.

I have also provided means whereby the action of the pawl 72 is interrupted when the handle 65 is moved into position to interrupt the lever 5. This means comprises a lever arm 73 carrying a releasing dog 74 in such position beneath the eccentric rod 71 that upon pulling the lever 73 to the left in the position shown in Figure 1, the pawl 72, which is in effect the end of the eccentric rod 71, will be raised from engagement with the ratchet wheel 61. I have shown fingers 75 upon the handle 65 for moving the lever 73 in either direction.

When the driving belt 21 is moving in the direction of the arrows in Figure 1, the pulley 2 will rotate in a clockwise direction and the pulley 20 in a counterclockwise direction. Assuming that the clutch connected with the pulley 2 is in engagement, the pinion 3 will drive the gear 1, the gear 1 moving in a counterclockwise direction. This drives the pinion 30, which is continuously in mesh with the gear 1, in a clockwise direction, but as the clutch connected with this latter pinion 30 is not in engagement, no damage results from reverse turning of the two clutch elements upon the same shaft 35. Rotation of the gear 1 rotates the eccentric 7, and each rotation of this eccentric advances the ratchet wheel 61 a predetermined fraction of a complete rotation. Upon completing a half rotation the cam wheel 62 controlled by the ratchet wheel 61 reverses the position of the lever 5 and throws the clutch elements connected with the pulley 20 into engagement, at the same time disengaging those connected with the pulley 2.

As the direction of movement of the belt 21 does not change the pulley 20 continues to move in a counterclockwise direction, but the direction of rotation of the pinion 30 is reversed from its former direction and it now rotates in a counterclockwise direction. This reverses the direction of the large gear 1, and consequently the pinion 3.

By this means, taking the power for reversal from the shaft on which the gear 1 is secured rather than from the gear 1 directly, a smooth movement is secured without any jarring, and consequently the action takes place more positively and certainly than in former constructions wherein the reversal occurred by reason of contact of a pin on the gear 1 with a reversing mechanism. Furthermore, the provision of the springs 11, operating between the eccentric and its driving gear, cushions any jars or shocks, particularly those attendant upon reversal, and permits the eccentric to complete its movement at the time of reversal, so that the ratchet wheel 61 is again in position to be advanced as the eccentric completes its next revolution. This contributes materially to the accuracy and reliability of this movement.

What I claim as my invention is:

1. A reversing mechanical movement including a driven member rotatable alternately in opposite directions, a pair of driving members rotatable continuously in opposite directions, a pair of power transmission members engageable continuously with the driven member, clutch elements engageable between each driving member and its corresponding power transmission member alternately, clutch reversing means including an eccentric rotatable by the driven member, and yieldable drive connections between the eccentric and the driven member.

2. A reversing mechanical movement including a driven gear and a pair of driving pulleys rotating in opposite directions, a pinion for each pulley in mesh with the driven gear, clutch members engageable between each pulley and its pinion alternately, a lever connecting a clutch member of each pair; a cam engageable with said lever to reverse the clutches, an eccentric rotatable by said driven gear, and means operated by said eccentric for actuating said cam.

3. A device as in claim 2 including a stop adapted to be manually interposed between said cam and lever to maintain the clutches in neutral position, and means for interrupting the drive connection between the eccentric and cam.

4. A device as in claim 2, including a control handle operable to hold the clutch elements in neutral position, and means operable with such movement of the handle to interrupt the actuation of said cam.

5. A device as in claim 2, the clutch-reversing cam being rotatable, and the cam actuating means comprising a ratchet wheel rotatable with the cam and an eccentric rod carrying a ratchet dog engageable with the ratchet wheel, a control handle operable to hold the clutch elements in neutral position, and a dog connected to be moved by such movement of the handle to interrupt the engagement of the ratchet wheel and eccentric rod dog.

6. A reversing mechanical movement including a driven gear, a pair of driving members rotating in opposite directions, a pinion complemental to each of said driving members and in mesh with the driven gear, clutch members engageable alternately between each driving member and its pinion, clutch reversing means, an eccentric rotatable with the driven gear to actuate said clutch reversing means, a common shaft supporting said driven gear and eccentric, one of said latter members being secured and the other member being loose thereon, and springs connecting the driven gear and eccentric.

7. A reversing mechanical movement including a driven gear and a pair of driving pulleys rotating in opposite directions, a pinion for each pulley in mesh with the driven gear, clutch members engageable between each pulley and its pinion, alternately, a rotatable cam operable to reverse said clutches, a ratchet wheel rotatable with said cam, an eccentric rotatable by said driven gear, an eccentric rod having a ratchet dog on its end engageable with said ratchet wheel, a manually-operable control handle, a stop carried thereby for maintaining the clutches in neutral position, a pivoted releasing dog operable to lift the ratchet dog from engagement with the ratchet wheel, and a lever arm carried by said releasing dog, and engageable by said control handle, whereby movement of the handle towards neutral position will actuate said releasing dog.

Signed at Renton, King County, Washington, this 31st day of July, 1922.

IRA J. MERRILL.